April 27, 1965   A. BENDITT ETAL   3,180,082
CANOPY UNLOCK THRUSTER
Filed Sept. 3, 1963

INVENTORS.
ALBERT BENDITT
CHARLES S. STERRETT
BY Harry M. Saragovitz,
Edward J. Kelly,
Herbert Berl &
S. Dubroff   ATTORNEYS.

United States Patent Office 3,180,082
Patented Apr. 27, 1965

3,180,082
CANOPY UNLOCK THRUSTER
Albert Benditt, Philadelphia, and Charles S. Sterrett, Meadowbrook, Pa., assignors to the United States of America as represented by the Secretary of the Army
Filed Sept. 3, 1963, Ser. No. 306,394
4 Claims. (Cl. 60—26.1)
(Granted under Title 35, U.S. Code (1952), sec. 266)

The invention described herein may be manufactured and used by or for the Government for governmental purposes without the payment to us of any royalty thereon.

This invention relates to propellant actuated devices which are utilized in aircraft emergency escape systems for unlocking and opening the aircraft canopy and for various other purposes.

The basic requirement for a canopy unlock thruster are twofold. It must produce sufficient force to overcome the inertia of the canopy and move it against an increasing resistive load. In conjunction with this requirement, it is necessary that the thrust and the time of operation be such that the forces produced are limited so as not to impose unreasonable loads on the canopy and its support structure. The second major requirement of the thruster is that it release sufficient gas pressure to actuate an initiator located elsewhere in the escape system. In connection with this second requirement, it is necessary that the release of the gas pressure be delayed until the stroke of the thruster has moved the canopy to its fully unlocked position.

The thruster of the present invention meets these requirements by means of a unique relation between its piston, its piston rod and the cylinder in which the piston moves. As will appear in greater detail, the piston and rod are hollow and the rod is perforated at a predetermined distance from the forward face of the piston. The cylinder has a stop shoulder against which the forward face of the piston comes to rest at the end of its stroke. As a result, there is formed near the end of the stroke a chamber wherein damping gas is trapped, the boundaries of this chamber consisting of the stop shoulder, the forward face of the piston, an inner surface of the cylinder and an outer surface of the piston rod. The gas trapped in this chamber is vented through a metering orifice in the piston and functions to dampen the piston's motion. At the end of the piston's stroke, the openings in the piston rod register with a gas outlet and gas pressure is applied therethrough to another part of the scape system.

An additional feature of the herein disclosed thruster is a shear ring which is releasably coupled to the cylinder and functions both to lock the rod against forward longitudinal movement and to permit its rotation prior to installation. This has the advantage that it minimizes the danger of an accidental rupture of the shear pins which have heretofore been between the cylinder and rod.

The invention will be better understood from the following description when considered with the accompanying drawings and its scope is indicated by the appended claims.

Referring to the drawings.

Figure 1:
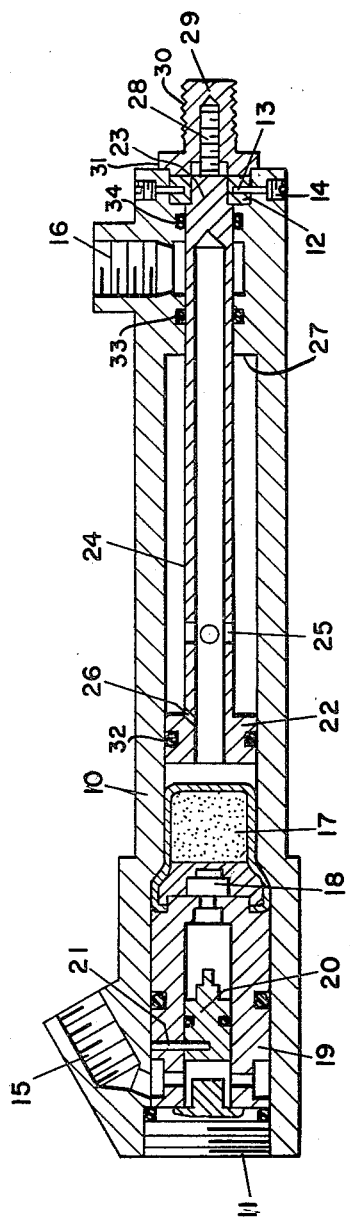
FIG. 1 is a sectional view of the thruster in its normal standby condition with the piston rod detachably or releasably interlocked with the cylinder.

The thruster of FIG. 1 includes a cylinder 10 which is closed at one end by a plug 11 and has its other end releasably attached to a shear ring 12 by means of shear pins 13 which are backed up by set screws 14. At the opposite ends of the cylinder 10 are a gas inlet 15 and a gas outlet 16.

Fixed within the firing chamber section of the cylinder 10 is a cartridge 17 which has a primer 18. Resting against this cartridge is a breech 19. A firing pin 20 is movable within the breech 19 and is releasably coupled thereto by a shear pin 21. A gas pressure applied through the inlet 15 severs the shear pin 21, drives the firing pin 20 against the primer 18 and fires the cartridge 17, thereby producing a high gas pressure in the firing chamber section of the cylinder 10.

This presure is applied to the rearward face of a hollow piston 22 and to a closure 23 at the forward end of a hollow piston rod 24. It is also applied through by-pass orifices 25 in the rod 24 to the forward face of the piston 22 which has a metering orifice 26 extending therethrough. There is thus formed, between an inner surface of the cylinder 10 and an outer surface of the rod, an annular chamber, closed at one end by the piston 22 and at the other end by an internal shoulder 27 of the cylinder 10, the chamber being sealed at its ends respectively by O-ring seals 32, 33. O-ring 34 sealingly engages rod 24 to prevent fluid from leaking forwardly therepast. Closure 23 of rod 24 is provided with an externally threaded screw member 28 projecting from its forward end. Latch connection 29, having a forward threaded portion 30 for attachment to an appropriate internally threaded canopy structure (not shown) and an external rearward shoulder 31, is suitably threaded on member 28 to the extent that shoulder 31 abuts cylinder 10 thereby restricting the rearward longitudinal movement of piston 22. Piston 22, its rod 24, and attachment connection 29 are rotatable as a unit relative to ring 12 and the relationship of the members is such that after installation, piston 22 is locked within cylinder 10 at a point forward of cartridge 17.

Figure 2:
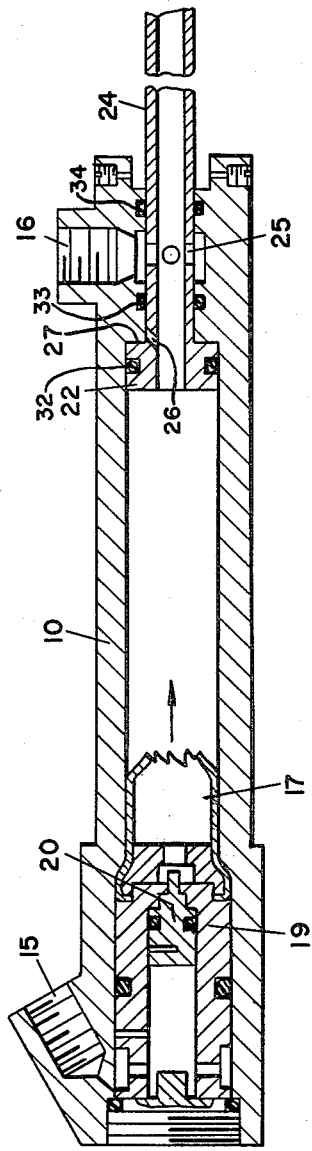
FIG. 2 represents the thruster as having been fired.

The by-pass orifices 25 are so located that they register with the outlet 16 when the piston 22 is resting against the shoulder 27 at the end of its stroke as illustrated by FIG. 2. In the illustrated embodiment of the invention, the total travel of the piston 22 is 2.80 inches. Of this travel, 2.40 inches are involved in the unlatching of the canopy and the last 0.40 inch has to do with the opening of the canopy and the damping of the piston's motion.

Figure 3:
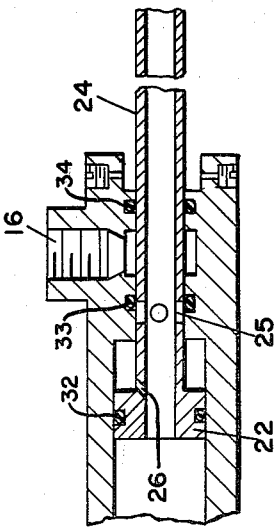
FIG. 3 is a partial section indicating a stage just prior to the damping part of the piston stroke.

In the operation of the thruster, gas from an external source, with a minimum pressure of 500 pounds per square inch, is applied through the inlet 15 and the breech 19 to the firing pin 20. This shears the pin 21 and drives the firing pin 20 against the percussion primer 18 thereby firing the cartridge 17. The resulting high pressure gas is applied to the rearward face of the piston, to the closure 23 at the forward end of the rod 24, and through the by-pass orifices 25 to the forward face of the piston. The relation between the last of these areas and the sum of the first two determine the force of the thrust. Under these conditions, adjustment of the effective piston area is readily attained by variation of the piston rod diameter. The applied force shears the pins 13 and moves the piston 22 and rod 24 unlatching the canopy when the piston has reached the position illustrated by FIG. 3. Thereafter, gas trapped between the cylinder, the piston and the piston rod is metered through the bleed orifice 26 which has a diameter of .040 inch, thereby damping the motion of the piston. In the final position of the piston, the by-pass orifices 25 register with the outlet 16, and high pressure gas is applied through this outlet to another part of the aircraft escape system.

We claim:

1. In a propellant actuated thruster device adaptable for use in an aircraft emergency system for unlocking and opening an aircraft canopy, the combination of a cylinder having at one rearward end a firing chamber and at the other end a laterally extending gas outlet, an internal shoulder on said cylinder between said chamber and outlet and located a predetermined distance rearwardly of said outlet, seal means on an inner wall of said cylinder forwardly of said outlet for preventing fluid leakage therepast, a hollow piston slidably inserted in said cylinder and having its rearward face adjacent said firing chamber, said piston having a metering orifice extending between its forward face and its interior, seal means on said piston and engaging an inner wall of said cylinder, a concentrical hollow rod with a closed forward end extending forwardly from said forward face, the interior of said rod opening into said firing chamber through said piston, said rod being extensible from said other end of said cylinder and having a plurality of by-pass orifices located a distance substantially equal to said predetermined distance forwardly of said forward piston face and leading from the interior of said rod to an annular cavity between said rod and said cylinder, said by-pass orifices being in fluid communication with both said metering orifice and said internal shoulder, seal means on said shoulder and engaging said hollow rod for defining with said piston seal the longitudinal extremities of said cavity, means releasably intercoupling said rod and said cylinder, and means for generating a gas pressure in said firing chamber.

2. A combination according to claim 1 wherein said intercoupling means includes a ring fixed to said cylinder by a shear pin and engaging an external shoulder on said rod.

3. A combination according to claim 2 including means for limiting the rearward movement of said piston.

4. A combination according to claim 3 wherein said means for limiting rearward movement of said piston comprises a cylinder-abutting attachment secured to an externally threaded member projecting from said closed forward end of said rod, said attachment having a forward threaded portion integral therewith and with said piston and rod defining means rotatable as a unit relative to said ring.

References Cited by the Examiner
UNITED STATES PATENTS

| | | | |
|---|---|---|---|
| 2,118,098 | 5/38 | Merenda | 91—189 X |
| 2,934,380 | 4/60 | Julier et al. | 60—26.1 X |
| 2,996,046 | 8/61 | Skopp et al. | 60—26.1 X |

FRED E. ENGELTHALER, *Primary Examiner.*

JULIUS E. WEST, *Examiner.*